June 11, 1957 A. E. SCHWANEKE 2,795,673
THERMOSTAT
Filed Jan. 12, 1955
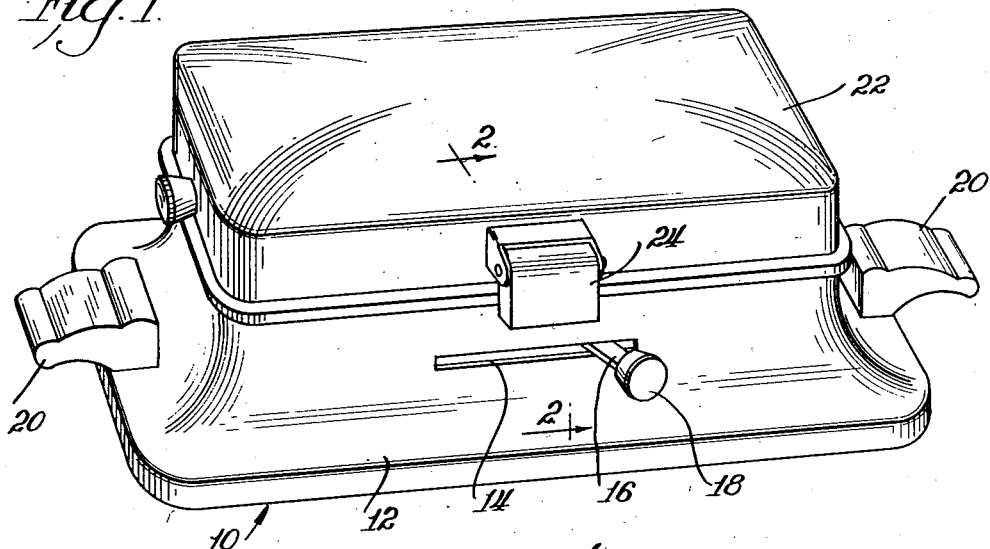
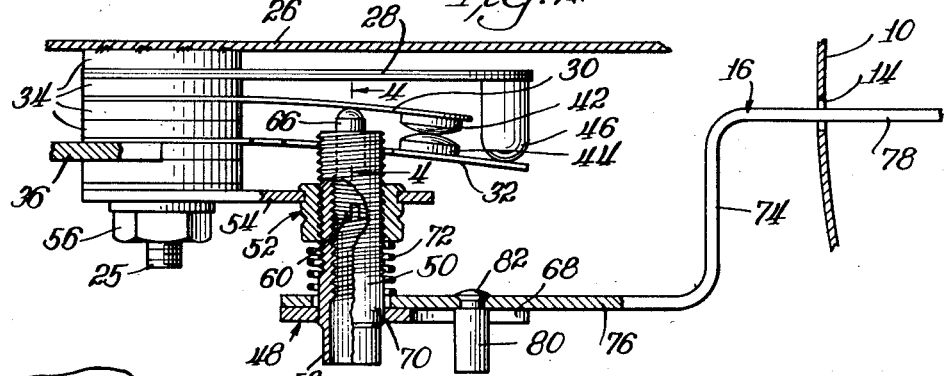
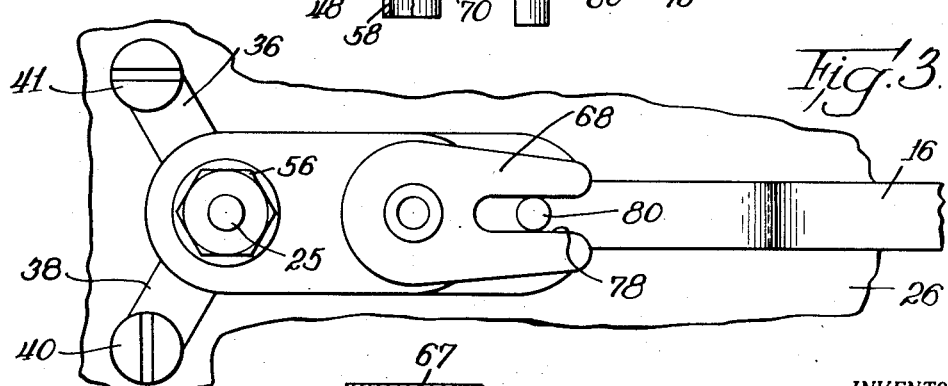
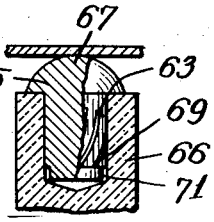
INVENTOR.
Alfred E. Schwaneke
BY
Atty.

United States Patent Office 2,795,673
Patented June 11, 1957

2,795,673

THERMOSTAT

Alfred E. Schwaneke, Northbrook, Ill., assignor to A-M Corporation, Chicago, Ill., a corporation of Illinois Application January 12, 1955, Serial No. 481,366

11 Claims. (Cl. 200—138)

This invention relates to a control device and more particularly to a thermostatic control for electric circuits. The invention is especially useful in controlling the flow of current to the heating element of a household utensil such as a waffle grid, a deep fat fryer, coffee pot or the like, although it may be used in numerous applications for accurate calibration in heat control of current through a circuit.

In the construction of the thermostatically controlled household utensils of the type indicated, it is desirable to form a very narrow slot in the housing to receive the thermostatic control swing arm so that food materials such as batters and the like used with the utensils will not have ready access to the interior of the utensil and foul the heating mechanism and wiring. Economical shop practice indicates that the slot be cut or otherwise provided between mating edges square with the major design dimensions.

In utensils having such a relatively narrow slot for the manual adjusting lever of the thermostat, stresses are produced in the thermostatic controls which cause undesirable deviations in operation. The adjusting lever is secured to a pin assembly which rides axially with a helical or spiral thread movement. This tends to raise or lower the lever at one end and results in deformation stresses in the pin assembly when the slot holds the lever at a fixed elevation at the other end. These stresses warp the assembly to an extent which will not only impair the accurate calibration of the thermostatic control, but also cause undue wear and poor operation. Even if the slot receiving the lever is of substantially greater width than the lever or swing arm, the tendency to press up or down on the arm during adjustment and use will also result in injury to the pin assembly.

The portion of the pin assembly which is adapted to engage the contact member is also subject to deformation stresses and will wear during protracted use to cause the calibration to change.

It is accordingly an object of the present invention to provide a thermostatic control which maintains its calibration over long periods of use; which is not subject to deformation as a result of a rigid connection between the manual control lever on the pin assembly, and includes an improved insulated pin adjustment relationship where a dielectric shaft has a wear resisting tip permanently supported therein to insulate current carrying members from the mounting bracket.

Another object of the invention is to provide a thermostatic manual adjusting means which is adapted to ride without any variation of frictional or mechanical resistance in a relatively narrow slot in a utensil housing.

Another object is to provide a manual adjusting lever and thermostat assembly which permits relative axial movement of the pin assembly and the lever at that point with loose coupled elements whose looseness is maintained collapsed in one direction for constancy of adjustment and calibration.

Another object of the invention is to provide a thermostatic control wherein an improved insulated contact portion of a switch assembly is supported against lateral strains and movements though operated by unskilled persons through a lever arrangement.

Another object is to provide a thermostatic pin assembly which may be subjected to relatively high temperatures without warping or stress which would tend to fracture or deform it.

Other objects are to provide a thermostat which is simple and economical to manufacture and which has an operating life exceeding that of thermostats currently used for cooking utensils and the like.

Referring now to the drawings:

Fig. 1 is a perspective view of a waffle grid, which is typical of the household utensils to which the thermostat of the invention may be applied;

Fig. 2 is a side elevational view of the thermostatic control according to the present invention, partly in vertical section;

Fig. 3 is a plan view of the thermostat according to the invention, partly broken away; and Fig. 4 is a vertical sectional view of the contact portion of a thermostat pin assembly according to the invention, partly in side elevation.

Referring now to Fig. 1, the waffle grid 10, which is representative of the cooking utensils and the like to which the thermostat of the invention may be applied, is provided with a base portion 12 containing the heating elements and having an elongated slot 14 formed therein adapted to receive therethrough the handle or manual operating lever 16 of a thermostatic control. In order to avoid an influx of cooking materials and batters into the interior of the utensil which would result in fouling any working parts, the slot 14 is preferably made as narrow as is feasibly and preferably has a width substantially the same as the thickness of the lever 16. Thus, the lever 16 will be moved horizontally in setting the thermostat by means of the knob 18 thereon and the narrow width of the slot 14 keeps the outer end of lever 16 in the horizontal plane during this operation.

The utensil is provided with other standard parts such as the handles 20, cover 22 and latch means 24, which will vary with the type of utensil for which the control is used.

Referring now to Fig. 2, a side elevational view of the thermostat accordiing to the present invention is disclosed wherein the thermostat is provided with a heat conducting bolt means 25 having its upper end fixed in plate 26 and adapted to secure the thermostat to the plate 26 of the cooking utensil, the plate 26 being adapted to have substantially the cooking temperature of the utensil during operation. A bimetallic heat responsive member 28, a first electrical contact member 30 and a second electrical contact member 32 are mounted on the bolt 25. Thus the heat of the utensil is conducted directly from the plate 26 to the bimetallic member 28 to deflect the same and thereby actuate the contact carrying switch members 30 and 32. Variations in this construction may be made without affecting the basic concept of the invention.

The bimetallic member 28 and the first and second contact members 30 and 32 are maintained in spaced relation by means of electrical insulating spacers 34 interposed between the base portions of the contact members 30 and 32, between the contact members 32 and the bimetallic member 28, and, between the bimetallic member 28 and the bottom wall 26. The contact members 30 and 32 are provided with terminals 36 and 38, best seen in Fig. 3, which are connected in the electrical circuit through leads (not shown) secured by the screw means 40 and 41. The contacts on the contact carrying elements 30 and 32 are identified at points 42 and 44 and are arranged to be held normally in closed contact as urged by the spring tension in the elements 30 and 32. They are separated when the bimetallic member 28 is deflected by heat as driven by an intermediate electrical insulating refractory stud 46 to interrupt the circuit to the heating coil at predetermined temperatures depending upon the fixed location of the contact member 30.

Means for adjusting the setting of the thermostat are disclosed generally at 48 in Fig. 2 as mounted rigidly in place on a bracket 54 held by a nut 56. An elongated pin assembly 50 is threadedly received for axial movement in the box nut 52 that is swaged to the bracket 54.

The pin assembly 50 comprises a sleeve bolt 58 having an external right hand thread for movement in the box nut 52 as stated, and an internal left hand thread which slidably receives a pin 66 therein as located adjustably by a set screw 60 which is kerfed at its lower end for adjustment by means of a screw driver or wrench. The pin 66 is made of an insulating material, such as ceramic, with a hole 63 in the end thereof to receive in a drive fit relationship a ribbed screw 65 having a rounded head engaging the switch element 30. The bolt and pin therein may be moved axially by means of the swing arm 16 to adjust the position of the contact member 30, to determine at what temperature the electric circuit through the control device will be interrupted.

As also seen in Fig. 2, the inner end of the swing arm 16 defines an aperture 59 whereby it is pivotally and somewhat loosely mounted on the bolt 58 where it is supported by an underlying coupling bracket 68 which is rigidly secured to the bolt 58 as by a knurled press fit at 70. The swing arm 16 is urged against the coupling bracket by means of a helical spring 72 seating preferably on boss 52, and is preferably formed so that the outer portion of the arm 74 is offset and parallel to the inner portion 76 for convenience of the operator. The spring collapses in a downward direction all tolerance or looseness in the threads and working parts.

Referring to Fig. 3, the coupling bracket 68 is provided with a radial slot 78 adapted to receive therein a depending pin 80 rigidly secured as by rivet means 82 to the inner arm 76 of the swing lever 16, and preferably perpendicular thereto. The diameter of the pin 80 is substantially the same as the width of the keying slot 78 and the pin is suitably spaced from the bolt 58 so that horizontal displacement or angular rotation of the swing arm 16 will cause a corresponding displacement or angular rotation of the bracket 68 and of the bolt 58 to which it is secured. The rotation of the bolt 58 will cause it to move vertically due to its threaded engagement in the helically threaded boss 52.

In the thermostats heretofore available, the swing arm is secured rigidly in a position normal to the pin assembly. When the swing arm is actuated to rotate the pin assembly and set the position of the contact members, the stresses between the arm and the pin tend to cock or draw the pin assembly toward the operator, thereby bending the bracket 54 and eventually causing the pin assembly to loosen and warp out of its initial alignment or expected axial position with respect to the contact members. These results are also to be found in utensils where the housing slot for the swing lever is relatively wide, since the natural tendency to push the lever downwardly or upwardly during activation thereof would create similar stresses on the pin assembly.

Applicant's provision of a loose pivotal connection between the swing arm and the pin assembly and of a coupling adapted to impart the same degree of angular rotation to the pin assembly as is given the swing arm, eliminates the stresses mentioned and preserves the alignment of the pin assembly and the calibration of the control. The helical spring insures that the parts are always disposed in operative position so that no binding will result when the inner end of the swing arm moves vertically relative to the pivot pin during rotation thereof.

Referring now to Figs. 2 and 4, the actuating pin element 66 is lightly held in the tubular bolt 58 and extends beyond the upper extremity thereof as adjustably positioned by the plunger element and is provided with a rivet pin 65 formed of steel or other suitably resistant metal of a low heat expansion coefficient. The rivet pin 65 cooperates with the above-described coupling means to prevent loss of calibration in the control through deformations of the pin assembly by overcoming the tendency of the insulating pin 66 to wear after extended contact with contact member 30. Thus even such materials as ceramics abrade after extended use, and the advantages of long lasting calibration provided by the coupling 48 are diminished if means are not employed to prevent this wear. The hardened tip afforded by pin 65 acts to maintain the fine calibration made possible by coupling 48.

As seen in Fig. 4, the pin 65 has a preferably hemispherical head 67 and a cylindrical shank 69 having a reduced end portion 71 adapted to be received in frictional engagement within a bore 63 at the upper extremity of the pin. The shank is also preferably provided with gradually spiraling lands or rifles spaced in parallel relationship from each other to impart to the pin 65 a slight amount of rotation during insertion thereof in bore 63 so that penetration will be relatively easy.

After the pin has been inserted, the rifling along the shank protects the pin 66 formed of insulating material from strains and stresses induced by expansion of the pin 65 under such heat as would tend to fracture the portion of the pin 66 forming the bore 63 since the rifling permits the shank to expand over a substantial portion of its cylindrical surface without encountering substantial resistance from the bore, and since the material of the shank can expand laterally to an extent within the groove or rifle portions thereof. Thus the rivet pin 65 can be more tightly engaged in bore 63 initially without fear of over-expansion and the firmer engagement in the bore made possible by the rifling further insures that the pin 65 will not work loose.

In the operation of the thermostat, the knob 18 is grasped to move the swing arm 16 to a desired setting. The spring element 30 is normally biased downwardly and the spring contact element 32 is normally biased upwardly but with a biasing force less than that of the member 30, and the pivotal movement of the swing arm 16 serves to rotate the assembly pin 58 in the helically threaded boss 52 for axial positioning thereof. The axial movement of pin 58 places contact element 30 in a desired position, as determined by initial calibration of the control, and the conduction of heat through bolt 25 to bimetal element 28 causes the bimetal element to deflect and the stud 46 thereon to separate the contacts 42 and 44 to break the circuit until such time as the resultant cooling disengages stud 46 once more. Since the pin 66 is of uniform length because of the wear-resistant characteristic of pin 65 and because the pivotal connection of swing arm 16 with pin assembly 48 preserves the original alignment of the pin assembly, the make and break of the bimetal element will occur at the same temperature for each setting as happened upon initial calibration, so that foods cooked will be uniformly produced over extended use of the utensil. The operation of the swing arm 16 will not be hampered by frictional engagement with the slot 14 as a result of the narrowness of the slot or the deformation in the angular setting of the arm which occurs in controls currently in use.

I claim:

1. In a thermostatic control device having a heat responsive element and a pair of electrical contact elements separable by said heat responsive member and a heat exchange and support unit for said elements, an elongated pin assembly threadedly mounted for movement along its longitudinal axis supported by said support unit to establish a selected contact position for said contact elements, a manually operable lever loosely and axially secured to said pin assembly and a coupling including a member rigidly fixed to said pin assembly and a member rigidly fixed to said lever, said members being freely movable relative to one another in a direction substantially parallel to the longitudinal axis of said pin and engaged against relative movement in a direction perpendicular to the first direction whereby to transmit the same degree of angular rotation to said pin assembly as is transmitted to said lever arm.

2. The thermostatic control according to claim 1 wherein the said coupling comprises a bracket fixedly secured to said pin assembly and extending along an axis perpendicular thereto and an upstanding projection on said swing arm adapted to engage said bracket whereby to transmit the same degree of angular rotation to said bracket and said pin assembly as is transmitted to said swing arm, said swing arm being adapted for relative movement axially of said pin assembly during angular rotation of said pin assembly.

3. In a thermostatic control device having a heat responsive element and a pair of electrical contact elements separable by said heat responsive member and a heat exchange and support unit for said elements, an elongated pin assembly threadedly mounted for movement along its longitudinal axis supported by said support unit to establish a selected contact position for said contact elements, a swing arm loosely and axially secured to said pin assembly and a coupling adapted to transmit the same degree of angular rotation to said pin assembly as is transmitted to said swing arm, said coupling comprising a bracket fixedly secured to said pin assembly and extending along an axis perpendicular thereto and a projection on said swing arm adapted to engage said bracket whereby to transmit the same degree of angular rotation to said bracket and said pin assembly as is transmitted to said swing arm, said swing arm being adapted for relative movement axially of said pin assembly during angular rotation of said pin assembly, an internally threaded boss for said support unit adapted to threadedly receive therein said pin assembly and a helical spring disposed axially on said pin assembly between said swing arm and said boss whereby said swing arm is biased into abutting relation with said first named bracket.

4. The thermostatic control according to claim 3 wherein said coupling is further characterized in that said bracket has formed thereon a pair of arms extending in substantially parallel relation to each other to define a slot and said projection is a pin fixedly secured on said swing arm in perpendicular relation thereto, said pin being adapted to extend between said arms and having a diameter substantially equal to the width of the slot defined by said arms.

5. A thermostatic control device having a heat responsive bimetal element, a pair of electrical contact elements and a heat exchange and support unit for said elements, an elongated pin assembly, an internally threaded boss on said support unit spaced from said support unit, said pin assembly being threadedly received in said boss, a swing arm pivotally and loosely secured to said pin assembly, a bracket fixedly secured to said assembly pin having two arms extending in parallel relationship to form a slot, a pin on said swing arm adapted to be received between said arms, and having a width substantially equal to the width of said slot, said bracket and swing arm pin providing a coupling for transmitting angular motion of said swing arm to said pin assembly, said pin assembly comprising a tubular bolt threaded externally and internally along a portion of the external and internal surfaces and having a smooth bore at an extremity adjacent said contact elements, an insulating pin frictionally engaged in said bore and having a smooth bore in its outer extremity, a plunger threadedly received in said bolt for adjustment of said insulating pin and a metal pin frictionally engaged in the external end of said insulating pin, said metal pin being adapted to cooperate with said coupling to maintain said pin assembly against deformation whereby to preserve calibration of said thermostatic control over extended periods of use.

6. In a thermostatic control having a heat responsive bimetal element, a pair of electrical contact elements and a heat exchange and support unit for said elements, a sleeve bolt adjustably supported by said support unit, an insulating pin retained axially in said sleeve bolt, said insulating pin having a smooth bore defined in its outer extremity, and a metal bearing pin having a smooth cylindrical metal shank frictionally engaged in said bore and extending slightly beyond said insulating pin whereby to engage one of said contact elements.

7. In a thermostatic control having a heat responsive bimetal element, a pair of electrical contact elements and a heat exchange and support unit for said elements, a pin assembly supported by said support unit, an insulating pin retained axially in said support unit, said insulating pin defining a smooth bore in its outer extremity, and a metal bearing pin having a rifled shank adapted for rotatable insertion in said bore and for gripping engagement therein with minimal stress thereagainst during thermal expansion.

8. In combination with a household utensil having electric heating means controllable by said thermostatic control and having a protective outer metal sheathing for said heating means and thermostatic control, said sheathing means having an elongated slot having its longitudinal axis disposed in perpendicular relation to the longitudinal axis of said pin assembly, said slot having a width substantially equal to the thickness of said swing arm whereby said swing arm may be received therethrough, a thermostatic control device having a heat responsive bimetal element, a pair of electrical contact elements and a heat exchange and support unit for said elements, an elongated pin assembly, an internally threaded boss on said support unit spaced from said support unit, said pin assembly being threadedly received in said boss, a swing arm pivotally and loosely secured to said pin assembly, a bracket fixedly secured to said assembly pin having two arms extending in parallel relationship to form a slot, a pin on said swing arm adapted to be received between said arms, and having a width substantially equal to the width of said slot, said bracket and swing arm pin providing a coupling for transmitting angular motion of said swing arm to said pin assembly, said pin assembly comprising a tubular bolt threaded externally and internally along a portion of the external and internal surfaces and having a smooth bore at an extremity adjacent said contact elements, an insulating pin frictionally engaged in said bore and having a smooth bore in its outer extremity, a plunger threadedly received in said bolt for adjustment of said insulating pin and a metal pin frictionally engaged in the external end of said insulating pin, said metal pin being adapted to cooperate with said coupling to maintain said pin assembly against deformation whereby to preserve calibration of said thermostatic control over extended periods of use.

9. In a thermostat control switch having a contact supporting spring and a frame supporting the spring, a screw threaded in said frame having a threaded opening through it, a cylindrical ceramic pin slidably mounted in said opening and having a cylindrical opening in the end thereof, a high spiral threaded rivet pressed into said end opening with the head thereof engaging said spring, and set screw means threaded into said threaded opening engaging the other end of said pin.

10. In a thermostat control switch having a contact supporting spring and a frame supporting the spring, a screw threaded in said frame having a threaded opening through it, a cylindrical ceramic pin slidably mounted in said opening and having a cylindrical opening in the end thereof, and a high spiral threaded rivet pressed into said end opening with the head thereof engaging said spring.

11. In a thermostat control switch having a contact supporting spring and a frame supporting the spring, a screw threaded in said frame having a threaded opening through it, a cylindrical ceramic pin slidably mounted in said opening and having a cylindrical opening in the end thereof, a rivet pressed into said end opening with the head thereof engaging said spring, said rivet having a shank characterized by high spiral threads adjacent the head and a smooth walled end portion remote from the head of a diameter less than the outside diameter of the threads, and set screw means threaded into said threaded opening engaging the other end of said pin.

References Cited in the file of this patent

UNITED STATES PATENTS

| | | |
|---|---|---|
| 2,008,163 | Walder | July 16, 1935 |
| 2,321,338 | Ulanet | June 8, 1943 |
| 2,584,016 | Hild | Jan. 29, 1952 |
| 2,613,461 | Weiland | Oct. 14, 1952 |